United States Patent
Inamura

(10) Patent No.: US 6,354,599 B1
(45) Date of Patent: Mar. 12, 2002

(54) GASKET WITH COMPRESSIBLE SEALING MEMBER AND HARD SUPPORT LAYER

(75) Inventor: Susunu Inamura, Utsunomiya (JP)

(73) Assignee: Ishikawa Gasket Co., Ltd., Tokyo (JP)

(*) Notice: Subject to any disclaimer, the term of this patent is extended or adjusted under 35 U.S.C. 154(b) by 0 days.

(21) Appl. No.: 09/497,125

(22) Filed: Feb. 3, 2000

(30) Foreign Application Priority Data

Mar. 1, 1999 (JP) .............................. 11-052850

(51) Int. Cl.$^7$ ................................................ F16J 15/06
(52) U.S. Cl. ......................................... 277/591; 277/593
(58) Field of Search .................................. 277/591, 593

(56) References Cited

U.S. PATENT DOCUMENTS

| | | | |
|---|---|---|---|
| 3,643,968 A | * 2/1972 | Horvath | 277/166 |
| 3,794,333 A | 2/1974 | Czernik et al. | |
| 3,889,961 A | * 6/1975 | Farnam | 277/166 |
| 5,794,947 A | * 8/1998 | Shimizu | 277/630 |
| 5,975,539 A | * 11/1999 | Ueda | 277/593 |
| 5,975,540 A | * 11/1999 | Miyaoh | 277/593 |

FOREIGN PATENT DOCUMENTS

| | | |
|---|---|---|
| EP | 0 807 773 | 11/1997 |
| EP | 0 852 309 | 7/1998 |
| FR | 2.032.044 | 11/1970 |

* cited by examiner

Primary Examiner—Anthony Knight
Assistant Examiner—Matthew E. Rodgers
(74) Attorney, Agent, or Firm—Kanesaka & Takeuchi

(57) ABSTRACT

A gasket is formed of a gasket member extending substantially throughout an entire area to be sealed, a compressible sealing member, and a hard coating. The gasket member has a first hole to be sealed, and a plurality of second holes for allowing bolts to pass therethrough situated around the first hole. The compressible sealing member is disposed on at least one side of the gasket member to completely surround the first hole without surrounding the second holes. The hard coating is disposed on the gasket member at the same side of the sealing member to surround the second holes. The hard coating is formed independently from the compressible sealing member and has compressibility less than that of the compressible sealing member. The gasket can be formed easily at a low cost.

5 Claims, 1 Drawing Sheet

GASKET WITH COMPRESSIBLE SEALING MEMBER AND HARD SUPPORT LAYER

BACKGROUND OF THE INVENTION AND RELATED ART STATEMENT

The present invention relates to a gasket with a compressible sealing member and a hard support layer for sealing around a hole. The gasket of the invention is used for an internal combustion engine, especially for sealing around a hole where moderate temperature and pressure are applied, such as around an oil hole and an oil pan. However, the gasket may be used, of course, for other general purposes.

In sealing around a hole where moderate temperature and pressure are applied, a gasket member may be formed of an elastic member, or the gasket member may be provided on a base plate with a soft sealing material around a hole to be sealed. However, when the gasket is tightened between engine parts by bolts, portions of the gasket near the bolt holes are especially strongly compressed, so that the portions near the bolt holes lose compressibility or resiliency in a long usage to thereby cause leakage thereat.

In order to obviate the above problems, U.S. Pat. No. 5,975,540 was proposed, wherein a resilient member made of foamed rubber is formed on at least one side of a base metal plate. In this gasket, after the foamed rubber is applied on the base metal plate around a hole to be sealed, parts of the foamed rubber near the bolt holes where the high tightening pressures by the bolts are applied are compressed to reduce resiliency or eliminate foams thereat. Since the resiliency near the bolt holes is eliminated by the compression treatment, tightening pressures applied by the bolts are not lost in a long usage, so that the gasket can be used for a long time without gas leakage. However, it requires a step of eliminating compressibility or resiliency at the parts of the foamed rubber.

The present invention has been made in view of the above, and an object of the invention is to provide a gasket with a compressible sealing member and a hard support layer, wherein decrease of tightening pressure by a bolt due to compression of the sealing member can be prevented or eliminated.

Another object of the invention is to provide a gasket as stated above, which can be manufactured easily at a low cost.

Further objects and advantages of the invention will be apparent from the following description of the invention.

SUMMARY OF THE INVENTION

A gasket of the invention is basically formed of a gasket member extending substantially throughout an entire area to be sealed, a compressible sealing member, and a hard coating, both being formed on the gasket member. The gasket member includes a first hole to be sealed, and a plurality of second holes for allowing bolts to pass therethrough. The second holes are arranged around the first hole.

The compressible sealing member is disposed on at least one side of the gasket member to surround the first hole adjacent thereto without surrounding the second holes. The hard coating is disposed on the same side as that of the compressible sealing member to surround the second holes. The hard coating is formed independently from the compressible sealing member, and does not substantially have compressibility.

Since the hard coating is formed around the bolt holes, when the gasket is tightened by the bolts, the hard coating is not substantially compressed or flattened around the bolt holes. Thus, the compressible sealing member surrounding the first hole is not completely compressed, and the resiliency thereof is not reduced so much in a long usage. Thus, the gasket can be used for a long time.

Also, in the invention, the compressible sealing member and the hard coating are formed separately on the gasket member. It is not required to compress a part of the compressible sealing member, as required in U.S. Pat. No. 5,975,540. Thus, the manufacturing process of the gasket is simplified, and it is possible to provide the gasket at a low cost.

In the invention, the hard coating is formed of a material different from that of the compressible sealing member. Preferably, the hard coating is hard rubber or resin, and the compressible sealing member may be a soft rubber or foam rubber.

In the invention, the hard coating is spaced from the compressible sealing member with a gap therebetween. The hard coating may be formed in each of the areas around the second holes to be spaced apart from each other, or the hard coating may be formed continuously to surround the compressible sealing member.

DETAILED DESCRIPTION OF PREFERRED EMBODIMENTS

The invention will be explained in detail with reference to the accompanying drawings.

Figure 1:
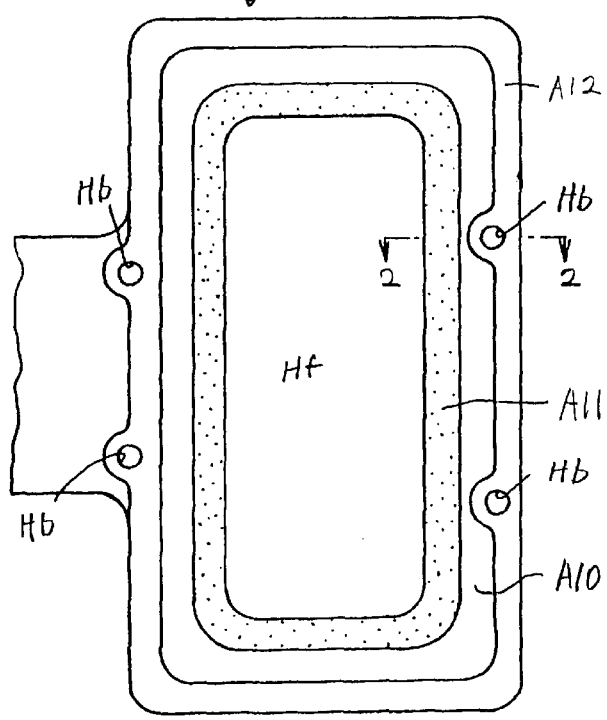
FIG. 1 is a plan view of a part of a gasket according to a first embodiment of the invention.
Figure 2:
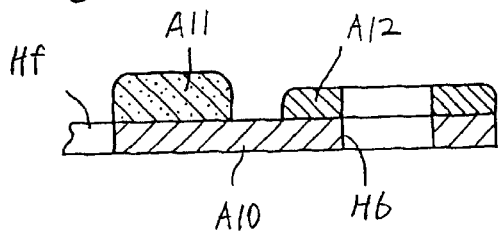
FIG. 2 is an enlarged sectional view taken along line 2—2 in FIG. 1.

FIGS. 1 and 2 show a gasket or sheet packing A of a first embodiment of the invention. The gasket of the invention having a structure as described below may be installed between a cylinder block and an oil pan (both not shown), or used for general purposes for connecting two parts.

The gasket A is formed of a base plate A10 extending substantially throughout an entire area to be sealed and having a fluid hole Hf and bolt holes Hb around the fluid hole Hf. The base plate A10 may be a metal plate to form a metal gasket.

The gasket A includes an elastic sealing member A11 and a hard support layer or coating A12, both being formed on one side of the base plate A10. The elastic sealing member A11 is formed around an inner edge of the base plate A10 to surround the fluid hole Hf to resiliently seal around the fluid hole Hf. The hard coating A12 is formed to surround the elastic sealing member A11 and the bolt holes Hb of the base plate A10 to support tightening pressures applied to the gasket A by bolts passing through the bolt holes Hb.

The height or thickness of the elastic sealing member A11 is greater than that of the hard coating A12 to thereby allow the elastic sealing member A11 to be compressed easily when the gasket A is tightened. A space is formed between the elastic sealing member A11 and the hard coating A12 so that the elastic sealing member A11 and the hard coating A12 are independent from each other.

The elastic sealing member A11 may be soft rubber or foamed rubber having good heat and wear resistances as well as compressibility. The elastic sealing member may be silicone rubber, polyurethane rubber or fluorine rubber. Other foamed or soft materials or synthetic resins suitable for sealing may be used.

The hard coating A12 may be hard rubber or synthetic resin. The hard coating may be epoxy resin, phenol resin, silicone resin, polyimide resin or fluorine resin. Other resins or rubber having low compressibility may be used.

When the gasket A is prepared, the elastic sealing member A11 and the hard coating A12 may be coated on the base plate A10 by, for example printing. On the other hand, the elastic sealing member A11 and the hard coating A12 may be adhered onto the base plate A10.

When the gasket A is situated between engine parts (not shown) and is compressed, the elastic sealing member A11 and the hard coating A12 are compressed. The elastic sealing member A11 is resiliently compressed to seal around the fluid hole Hf. When the hard coating A12 is compressed, since the hard coating A12 does not have resiliency, or has very little resiliency, the tightening pressure by the bolts is supported by the hard coating A12. Since the hard coating A12 supports the tightening pressure by the bolts, the elastic sealing member A11 is not completely compressed or flattened. Thus, even if the gasket is used for a long time, the elastic sealing member A11 does not lose its resiliency to thereby securely seal around the fluid hole Hf.

In the gasket A, since the hard coating A12 is formed all around the elastic sealing member A11, the hard coating A12 also seals around the fluid hole Hf. Since the hard coating A12 is spaced from the elastic sealing member A11, the elastic sealing member A11 and the hard coating A12 seal around the fluid hole Hf independently.

Figure 3:
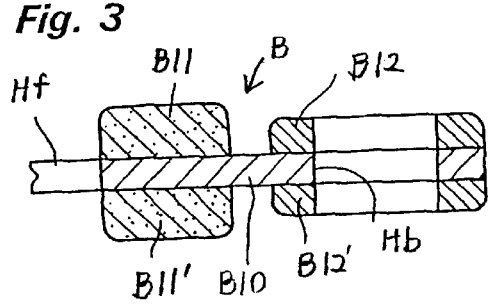
FIG. 3 is a sectional view, similar to FIG. 2, of a second embodiment of the invention.

FIG. 3 is a second embodiment B of a gasket of the invention. The gasket B includes a base plate B10, an elastic sealing member B11 and a hard coating B12, similar to the gasket A. In the gasket B, however, an elastic sealing member B11' and a hard coating B12' are formed additionally on the base plate B10 such that the elastic sealing members B11, B11' and the hard coating B12, B12' are symmetrical relative to the base plate B10. Since the elastic sealing members B11, B11' are formed on both sides of the base plate B10, the fluid hole Hf can be securely sealed in the gasket B.

Figure 4:
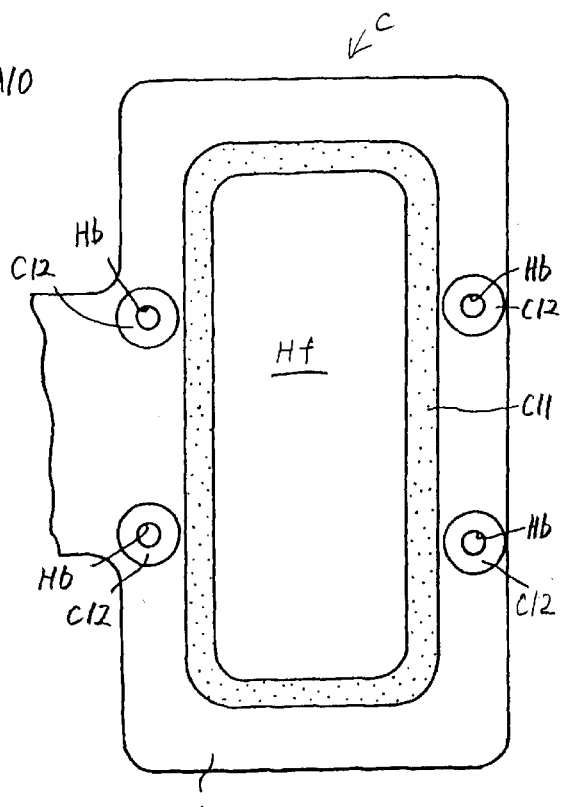
FIG. 4 is a plan view of a part of a gasket according to a third embodiment of the invention.

FIG. 4 is a third embodiment C of a gasket of the invention. The gasket C includes a base plate C10, and an elastic sealing member C11 around a fluid hole Hf, similar to the gasket A. In the gasket C, instead of forming a hard coating to surround the elastic sealing member as shown in the gasket A, hard coatings C12 are formed around the bolt holes Hb to support the tightening pressures applied thereto. Since the tightening pressures by the bolts located in the bolt holes Hb are supported by the hard coatings C12 formed around the bolt holes Hb, the elastic sealing member C11 is not excessively compressed when the gasket is installed in the engine parts. Thus, creep relaxation of the elastic sealing member C11 is reduced or prevented. The rest of the structure and operation of the gasket C are the same as those disclosed in the gasket A.

In the above embodiments, one elastic sealing member in the annular shape is formed around the fluid hole. However, it is possible to form a plurality of annular elastic sealing members around the fluid hole. Also, an elastic sealing member may be formed additionally at a portion away from the bolt hole.

In the present invention, since the elastic sealing member and the hard coating are formed on the base plate without special treatment, the gasket can be formed easily and simply, resulting in manufacturing the gasket at a low cost.

While the invention has been explained with reference to the specific embodiments of the invention, the explanation is illustrative and the invention is limited only by the appended claims.

What is claimed is:

1. A gasket, comprising:

a gasket member extending substantially throughout an entire area to be sealed, said gasket member having a first hole to be sealed and a plurality of second holes for allowing bolts to pass therethrough situated around the first hole, a compressible sealing member disposed on at least one side of the gasket member to completely surround the first hole adjacent thereto without surrounding the second holes, and a hard coating formed of a material different from those of the gasket member and the compressible sealing member and disposed on at least said one side of the gasket member to surround the second holes, said hard coating being formed independently from the compressible sealing member and having compressibility less than that of the compressible sealing member so that a reduction of compressibility around the second holes in use is suppressed, said hard coating being spaced from the compressible sealing member with a gap therebetween and formed in each of areas around the second holes to be spaced from each other.

2. A gasket according to claim 1, wherein said compressible sealing member is made of a material selected from a group consisting of silicone rubber, polyurethane rubber and fluorine rubber, and said hard coating is a synthetic resin selected from a group consisting of epoxy resin, phenol resin, silicone resin, polyimide resin and fluorine resin.

3. A gasket, comprising:

a gasket member extending substantially throughout an entire area to be sealed, said gasket member having a first hole to be sealed and a plurality of second holes for allowing bolts to pass therethrough situated around the first hole, a compressible sealing member disposed on at least one side of the gasket member to completely surround the first hole adjacent thereto without surrounding the second holes, and a hard coating formed of a material different from those of the gasket member and the compressible sealing member and disposed on at least said one side of the gasket member to surround the second holes, said hard coating being formed independently from the compressible sealing member and having compressibility less than that of the compressible sealing member so that a reduction of compressibility around the second holes in use is suppressed, said hard coating being spaced from the compressible sealing member with a gap therebetween and formed continuously to surround the compressible sealing member.

4. A gasket according to claim 3, further comprising a hard coating and a compressible sealing member such that the hard coatings and the compressible sealing members are formed on two sides of the gasket member symmetrically to the gasket member.

5. A gasket according to claim 3, wherein said gasket member is made of metal to form a metal gasket.

* * * * *

UNITED STATES PATENT AND TRADEMARK OFFICE
CERTIFICATE OF CORRECTION

PATENT NO.    : 6,354,599 B1
DATED         : March 12, 2002
INVENTOR(S)   : Susumu Inamura It is certified that error appears in the above-identified patent and that said Letters Patent is hereby corrected as shown below:

<u>Title page,</u>
Item [75], Inventor, change "Susunu" to -- Susumu --; and
Item [57], ABSTRACT,
Line 10, before "of", add -- as that -- .

Signed and Sealed this

Eighteenth Day of June, 2002

Attest:

Attesting Officer

JAMES E. ROGAN
*Director of the United States Patent and Trademark Office*